US009281716B2

(12) United States Patent
Albsmeier et al.

(10) Patent No.: US 9,281,716 B2
(45) Date of Patent: Mar. 8, 2016

(54) GENERATOR CONTROLLER CONFIGURED FOR PREVENTING AUTOMATIC TRANSFER SWITCH FROM SUPPLYING POWER TO THE SELECTED LOAD

(71) Applicant: Kohler Co., Kohler, WI (US)

(72) Inventors: Eric D. Albsmeier, Sheboygan, WI (US); Douglas W. Dorn, Sheboygan Falls, WI (US); William Herman Gross, Oostburg, WI (US); Andrew John Sember, Plymouth, WI (US); Anthony J. Hackbarth, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 357 days.

(21) Appl. No.: 13/736,998

(22) Filed: Jan. 9, 2013

(65) Prior Publication Data

US 2013/0154370 A1    Jun. 20, 2013

Related U.S. Application Data

(63) Continuation-in-part of application No. 13/664,677, filed on Oct. 31, 2012.

(60) Provisional application No. 61/577,816, filed on Dec. 20, 2011.

(51) Int. Cl.
  *G06F 1/26* (2006.01)
  *H02J 9/06* (2006.01)
  (Continued)

(52) U.S. Cl.
  CPC ... *H02J 9/06* (2013.01); *G06F 1/26* (2013.01); *H02J 9/08* (2013.01); *H02J 4/00* (2013.01); *Y10T 307/391* (2015.04); *Y10T 307/615* (2015.04); *Y10T 307/696* (2015.04)

(58) Field of Classification Search
  CPC ... H04L 9/00; H04L 63/0428; G01M 15/046; H02J 3/383; H02J 3/14; H02J 9/06; Y10T 307/587; Y10T 307/615; Y10T 307/658; Y10T 307/707; G06F 1/26; G06F 1/266; H04M 11/066; H04M 3/42; H04M 3/42391; H04M 3/493; H04M 3/527; H04M 3/533
  USPC ............................................................ 713/310
  See application file for complete search history.

(56) References Cited

U.S. PATENT DOCUMENTS

| | | | |
|---|---|---|---|
| 4,031,406 | A | 6/1977 | Leyde et al. |
| 4,034,233 | A | 7/1977 | Leyde |

(Continued)

FOREIGN PATENT DOCUMENTS

| | | |
|---|---|---|
| WO | WO-2011/027195 | 3/2011 |
| WO | WO-2011/027195 A1 | 3/2011 |

(Continued)

OTHER PUBLICATIONS

"International Application Serial No. PCT/US2012/070337, International Preliminary Report on Patentability mailed Jul. 3, 2014", 7 pgs.

(Continued)

*Primary Examiner* — Thomas Lee
*Assistant Examiner* — Santosh R Poudel
(74) *Attorney, Agent, or Firm* — Schwegman Lundberg & Woessner, P.A.

(57) ABSTRACT

A power management system may include a generator controller. The generator controller may (i) operate the generator; and (ii) prohibit a transfer switch from supplying first or second power to an output of the transfer switch. In some systems, the first power may be primary power (e.g., from a primary power source such as a utility) while the second power is secondary power (e.g., from a secondary power source such as a generator). In other systems, the second power may be primary power while the first power is secondary power, or both the first and second power may be secondary power.

20 Claims, 11 Drawing Sheets (51) Int. Cl.
*H02J 9/08* (2006.01)
*H02J 4/00* (2006.01)

(56) References Cited

U.S. PATENT DOCUMENTS

| | | | |
|---|---|---|---|
| 4,064,485 A | 12/1977 | Leyde | |
| 4,099,067 A | 7/1978 | Szentes et al. | |
| 4,639,657 A | 1/1987 | Frierdich | |
| 4,701,690 A | 10/1987 | Fernandez et al. | |
| 4,731,547 A | 3/1988 | Alenduff et al. | |
| 4,800,291 A | 1/1989 | Bowers | |
| 4,982,149 A * | 1/1991 | Shimanuki | 323/274 |
| 5,294,879 A | 3/1994 | Freeman | |
| 5,414,640 A | 5/1995 | Seem | |
| 5,422,517 A | 6/1995 | Verney et al. | |
| 5,604,421 A | 2/1997 | Barnsley | |
| 5,640,060 A | 6/1997 | Dickson | |
| 5,684,710 A | 11/1997 | Ehlers et al. | |
| 5,761,073 A | 6/1998 | Dickson | |
| 5,861,683 A | 1/1999 | Engel et al. | |
| 5,880,537 A | 3/1999 | Windhorn | |
| 6,067,482 A * | 5/2000 | Shapiro | 700/286 |
| 6,104,171 A | 8/2000 | Dvorsky et al. | |
| 6,107,927 A | 8/2000 | Dvorsky et al. | |
| 6,114,775 A * | 9/2000 | Chung et al. | 307/10.1 |
| 6,163,088 A | 12/2000 | Codina et al. | |
| 6,172,432 B1 * | 1/2001 | Schnackenberg et al. | 307/23 |
| 6,191,500 B1 | 2/2001 | Toy | |
| 6,362,985 B1 | 3/2002 | Haneda et al. | |
| 6,531,790 B2 | 3/2003 | Panuce et al. | |
| 6,552,888 B2 | 4/2003 | Weinberger | |
| 6,593,670 B2 | 7/2003 | Anderson | |
| 6,631,310 B1 | 10/2003 | Leslie | |
| 6,653,821 B2 | 11/2003 | Kern et al. | |
| 6,657,416 B2 | 12/2003 | Kern et al. | |
| 6,668,629 B1 | 12/2003 | Leslie | |
| 6,686,547 B2 | 2/2004 | Kern et al. | |
| 6,691,065 B2 | 2/2004 | Hayashi et al. | |
| 6,739,145 B2 | 5/2004 | Bhatnagar | |
| 6,747,368 B2 | 6/2004 | Jarrett, Jr. | |
| 6,791,208 B2 | 9/2004 | Pfeiffer | |
| 6,798,187 B1 | 9/2004 | Czarnecki | |
| 6,801,019 B2 | 10/2004 | Haydock et al. | |
| 6,825,578 B2 | 11/2004 | Perttu | |
| 6,833,694 B2 | 12/2004 | Ikekame | |
| 6,876,103 B2 | 4/2005 | Radusewicz et al. | |
| 6,882,904 B1 | 4/2005 | Petrie et al. | |
| 6,912,889 B2 | 7/2005 | Staphanos et al. | |
| 6,983,640 B1 | 1/2006 | Staphanos et al. | |
| 7,015,599 B2 | 3/2006 | Gull | |
| 7,053,497 B2 | 5/2006 | Sodemann et al. | |
| 7,119,457 B1 | 10/2006 | Flegel | |
| 7,133,787 B2 | 11/2006 | Mizumaki | |
| 7,146,256 B2 | 12/2006 | Hibi et al. | |
| 7,149,605 B2 | 12/2006 | Chassin et al. | |
| 7,177,612 B2 | 2/2007 | Nakamura et al. | |
| 7,177,728 B2 | 2/2007 | Gardner | |
| 7,208,850 B2 | 4/2007 | Turner | |
| 7,218,998 B1 | 5/2007 | Neale | |
| 7,230,345 B2 | 6/2007 | Winnie et al. | |
| 7,239,045 B2 | 7/2007 | Lathrop | |
| 7,245,036 B2 | 7/2007 | Endou et al. | |
| 7,274,974 B2 | 9/2007 | Brown | |
| 7,336,003 B2 | 2/2008 | Lathrop et al. | |
| 7,345,456 B2 | 3/2008 | Gibbs et al. | |
| 7,356,384 B2 | 4/2008 | Gull et al. | |
| 7,362,696 B2 | 4/2008 | Ferry et al. | |
| 7,446,425 B2 | 11/2008 | Sato | |
| 7,460,931 B2 | 12/2008 | Jacobson | |
| 7,489,988 B2 * | 2/2009 | Matsui | H02J 3/14 700/287 |
| 7,521,822 B2 | 4/2009 | Lorenz | |
| 7,557,544 B2 | 7/2009 | Heinz et al. | |
| 7,573,145 B2 | 8/2009 | Peterson | |
| 7,579,712 B2 | 8/2009 | Yanagihashi et al. | |
| 7,582,986 B2 | 9/2009 | Folkers et al. | |
| 7,598,623 B2 | 10/2009 | Fattal et al. | |
| 7,608,948 B2 | 10/2009 | Nearhoof et al. | |
| 7,619,324 B2 | 11/2009 | Folken et al. | |
| 7,656,060 B2 | 2/2010 | Algrain | |
| 7,687,929 B2 | 3/2010 | Fattal | |
| 7,715,951 B2 | 5/2010 | Forbes, Jr. et al. | |
| 7,747,355 B2 | 6/2010 | Bulthaup et al. | |
| 7,778,737 B2 | 8/2010 | Rossi et al. | |
| 7,786,616 B2 | 8/2010 | Naden et al. | |
| 7,795,851 B2 | 9/2010 | Ye et al. | |
| 7,855,871 B2 | 12/2010 | Hudgins, Jr. et al. | |
| 7,948,117 B2 | 5/2011 | Lathrop et al. | |
| 8,009,039 B2 | 8/2011 | Fallin et al. | |
| 8,027,180 B2 | 9/2011 | Nakagawa | |
| 8,032,233 B2 | 10/2011 | Forbes et al. | |
| 8,065,050 B2 | 11/2011 | West et al. | |
| 8,140,414 B2 * | 3/2012 | O'Neil et al. | 705/34 |
| 8,169,755 B2 | 5/2012 | Sugita | |
| 8,205,594 B2 | 6/2012 | Fore et al. | |
| 8,237,300 B2 * | 8/2012 | Allen | H02J 9/08 290/40 C |
| 8,288,890 B2 * | 10/2012 | Young | 307/64 |
| 8,417,391 B1 | 4/2013 | Rombouts et al. | |
| 8,736,090 B2 * | 5/2014 | Riihimaki | 290/40 R |
| 8,942,854 B2 * | 1/2015 | Mauk | G06Q 50/06 340/870.02 |
| 2001/0005894 A1 | 6/2001 | Fukui | |
| 2002/0033020 A1 * | 3/2002 | Tonomura et al. | 60/641.8 |
| 2002/0079741 A1 | 6/2002 | Anderson | |
| 2002/0111905 A1 * | 8/2002 | Nagafuchi et al. | 705/40 |
| 2003/0023888 A1 * | 1/2003 | Smith | G06F 1/30 713/300 |
| 2003/0075982 A1 | 4/2003 | Seefeldt | |
| 2003/0107349 A1 | 6/2003 | Haydock et al. | |
| 2003/0157928 A1 * | 8/2003 | Phillips | 455/414 |
| 2004/0051515 A1 | 3/2004 | Ikekame | |
| 2004/0052044 A1 * | 3/2004 | Mochizuki et al. | 361/683 |
| 2004/0075343 A1 | 4/2004 | Wareham et al. | |
| 2004/0095237 A1 * | 5/2004 | Chen et al. | 340/506 |
| 2004/0199297 A1 * | 10/2004 | Schaper et al. | 700/287 |
| 2004/0243525 A1 * | 12/2004 | Forrester | 705/412 |
| 2005/0024905 A1 * | 2/2005 | Shiojima | 363/110 |
| 2005/0059473 A1 | 3/2005 | Nakamura et al. | |
| 2005/0063117 A1 | 3/2005 | Amano et al. | |
| 2005/0072220 A1 | 4/2005 | Staphanos et al. | |
| 2005/0099131 A1 * | 5/2005 | Amarillas et al. | 315/64 |
| 2005/0105399 A1 | 5/2005 | Strumpf et al. | |
| 2005/0116814 A1 | 6/2005 | Rodgers et al. | |
| 2005/0125519 A1 | 6/2005 | Yang et al. | |
| 2005/0128659 A1 | 6/2005 | Hibi et al. | |
| 2005/0141154 A1 | 6/2005 | Consadori et al. | |
| 2005/0188745 A1 | 9/2005 | Staphanos et al. | |
| 2005/0216131 A1 | 9/2005 | Sodemann et al. | |
| 2005/0268164 A1 * | 12/2005 | Hara | 714/14 |
| 2006/0022950 A1 * | 2/2006 | Friedrichs | 345/169 |
| 2006/0028069 A1 | 2/2006 | Loucks et al. | |
| 2006/0129798 A1 | 6/2006 | Bance et al. | |
| 2006/0146488 A1 * | 7/2006 | Kimmel | 361/681 |
| 2006/0187600 A1 | 8/2006 | Brown et al. | |
| 2006/0203814 A1 | 9/2006 | Ye et al. | |
| 2006/0284843 A1 | 12/2006 | Endou et al. | |
| 2007/0010916 A1 | 1/2007 | Rodgers et al. | |
| 2007/0094131 A1 * | 4/2007 | Wymore et al. | 705/39 |
| 2007/0120538 A1 | 5/2007 | Sato | |
| 2007/0129851 A1 | 6/2007 | Rossi et al. | |
| 2007/0222294 A1 | 9/2007 | Tsukida et al. | |
| 2007/0222295 A1 | 9/2007 | Wareham | |
| 2007/0241739 A1 * | 10/2007 | Uenou et al. | 324/76.17 |
| 2007/0266423 A1 | 11/2007 | Tehee | |
| 2008/0086394 A1 * | 4/2008 | O'Neil et al. | 705/30 |
| 2008/0091626 A1 * | 4/2008 | Kremen | 705/412 |
| 2008/0150360 A1 | 6/2008 | Vezza et al. | |
| 2008/0157593 A1 | 7/2008 | Bax et al. | |
| 2008/0157600 A1 | 7/2008 | Marlenee et al. | |
| 2008/0179958 A1 * | 7/2008 | Lathrop et al. | 307/68 |
| 2008/0211455 A1 * | 9/2008 | Park et al. | 320/108 |
| 2008/0313006 A1 | 12/2008 | Witter et al. | |
| 2009/0108678 A1 | 4/2009 | Algrain | |

(56) References Cited

U.S. PATENT DOCUMENTS

| | | |
|---|---|---|
| 2009/0113874 A1 | 5/2009 | McKee |
| 2009/0152951 A1 | 6/2009 | Algrain |
| 2009/0179498 A1 | 7/2009 | Lathrop et al. |
| 2009/0195224 A1 | 8/2009 | Kim |
| 2009/0198386 A1 | 8/2009 | Kim et al. |
| 2009/0216386 A1 | 8/2009 | Wedel |
| 2009/0240377 A1 | 9/2009 | Batzler et al. |
| 2009/0290270 A1 | 11/2009 | Ganev et al. |
| 2010/0007313 A1 | 1/2010 | Jakeman et al. |
| 2010/0019574 A1* | 1/2010 | Baldassarre et al. ............ 307/23 |
| 2010/0038966 A1 | 2/2010 | Espeut, Jr. |
| 2010/0039077 A1 | 2/2010 | Dalby |
| 2010/0066551 A1 | 3/2010 | Bailey et al. |
| 2010/0094475 A1 | 4/2010 | Masters et al. |
| 2010/0102637 A1 | 4/2010 | Dozier et al. |
| 2010/0109344 A1 | 5/2010 | Conway et al. |
| 2010/0114394 A1* | 5/2010 | Kobayashi et al. ........... 700/295 |
| 2010/0148588 A1 | 6/2010 | Algrain |
| 2010/0156117 A1 | 6/2010 | Allen |
| 2010/0156191 A1 | 6/2010 | Dozier et al. |
| 2010/0179893 A1* | 7/2010 | Burke et al. .................... 705/31 |
| 2010/0181177 A1* | 7/2010 | Young ............................ 200/336 |
| 2010/0225167 A1 | 9/2010 | Stair et al. |
| 2010/0253140 A1* | 10/2010 | Yamashita .................... 307/9.1 |
| 2010/0288326 A1* | 11/2010 | Schroeder et al. ............ 136/206 |
| 2011/0017717 A1* | 1/2011 | Farah et al. .................... 219/133 |
| 2011/0068631 A1 | 3/2011 | Roscoe |
| 2011/0109291 A1 | 5/2011 | Tang et al. |
| 2011/0148360 A1* | 6/2011 | Lee ................................ 320/134 |
| 2011/0173470 A1* | 7/2011 | Tran .............................. 713/323 |
| 2011/0175450 A1* | 7/2011 | Vicari et al. ................... 307/62 |
| 2011/0175742 A1* | 7/2011 | Shin et al. ..................... 340/635 |
| 2011/0254370 A1 | 10/2011 | Wischstadt et al. |
| 2011/0291411 A1 | 12/2011 | Folken |
| 2011/0291483 A1* | 12/2011 | Yamane et al. ................. 307/65 |
| 2011/0296169 A1* | 12/2011 | Palmer .......................... 713/153 |
| 2011/0298285 A1 | 12/2011 | Lim et al. |
| 2011/0298286 A1 | 12/2011 | Batzler et al. |
| 2012/0090966 A1 | 4/2012 | Lathrop |
| 2012/0179547 A1 | 7/2012 | Besore et al. |
| 2012/0217315 A1 | 8/2012 | Witbeck et al. |
| 2012/0242451 A1 | 9/2012 | Tanaka et al. |
| 2012/0256483 A1 | 10/2012 | Nakashima et al. |
| 2013/0018843 A1 | 1/2013 | Bultman et al. |
| 2013/0079943 A1 | 3/2013 | Darden et al. |
| 2013/0106190 A1* | 5/2013 | Lin et al. ........................ 307/64 |
| 2013/0147412 A1* | 6/2013 | Solodovnik et al. .......... 318/454 |
| 2013/0158726 A1 | 6/2013 | Mauk |
| 2013/0159738 A1 | 6/2013 | Mauk et al. |
| 2014/0001873 A1 | 1/2014 | Tian et al. |

FOREIGN PATENT DOCUMENTS

| | | |
|---|---|---|
| WO | WO-2011/085477 A1 | 7/2011 |
| WO | WO-2013/096307 A1 | 6/2013 |

OTHER PUBLICATIONS

"International Application Serial No. PCT/US2012/070337, International Search Report mailed Apr. 23, 2013", 5 pgs.

"International Application Serial No. PCT/US2012/070337, Invitation to Pay Additional Fees and Partial Search Report mailed Feb. 8, 2013", 2 pgs.

"International Application Serial No. PCT/US2012/070337, Written Opinion mailed Apr. 23, 2013", 5 pgs.

"U.S. Appl. No. 13/664,677, Non Final Office Action mailed Oct. 21, 2014", 21 pgs.

"U.S. Appl. No. 13/664,677, Response filed Feb. 6, 2015 to Non Final Office Action mailed Oct. 21, 2014", 14 pgs.

Inoue, Masahiro, et al., "Network Architecture for Home Energy Management System", IEEE Transactions on Consumer Electronics, vol. 49, Issue 3, (Aug. 2003), 606-613.

"U.S. Appl. No. 13/663,847, Non Final Office Action mailed Apr. 3, 2015", 8 pgs.

"U.S. Appl. No. 13/663,847, Response filed Jun. 29, 2015 to Non Final Office Action mailed Apr. 3, 2015", 9 pgs.

"European Application No. 13188723.4, Extended European Search Report mailed Mar. 27, 2014", 5 pgs.

"European Application No. 13188723.4, Notification of European Publication No. mailed Apr. 9, 2014", 2 pgs.

\* cited by examiner

GENERATOR CONTROLLER CONFIGURED FOR PREVENTING AUTOMATIC TRANSFER SWITCH FROM SUPPLYING POWER TO THE SELECTED LOAD

CLAIM OF PRIORITY

This application is a Continuation-in Part of and claims the benefit of priority under 35 U.S.C. §120 to U.S. patent application Ser. No. 13/664,677, filed on Oct. 31, 2012, which claims the benefit of priority under 35 U.S.C. §119(e) to U.S. Provisional Patent Application Ser. No. 61/577,816, filed on Dec. 20, 2011, the benefit of priority of each of which is claimed hereby, and each of which are incorporated by reference herein in its entirety.

TECHNICAL FIELD

This disclosure pertains to a power management system that includes a generator controller, and more particularly to a power management system that includes a generator controller which may selectively activate a transfer switch.

BACKGROUND

Existing power management systems typically provide a power to variety of loads using a primary power source (e.g., utility). These systems also often include a secondary power source (e.g., a generator) that provides power to the loads when the primary power source becomes unavailable (e.g., during a power outage).

One common type of electric generator includes an internal combustion engine. The internal combustion engine drives an electrical alternator that produces alternating electricity.

An automatic transfer switch is typically used to switch from primary power to secondary power when the primary power becomes unavailable. The transfer switch typically detects when primary power has been lost and then sends a signal to start the generator. Once the generator is running and available to provide secondary power, the transfer switch switches the loads over to the generator.

In addition, when the transfer switch detects that primary power has been restored, the transfer switch switches the loads back over to primary power. Once the transfer switch switches the loads back over to primary power, the transfer switch sends a stop signal to the generator.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A power management system may include a generator controller. The generator controller may (i) operate the generator; and (ii) prohibit a transfer switch from supplying first or second power to an output of the transfer switch. In some systems, the first power may be primary power (e.g., from a primary power source such as a utility) while the second power may be secondary power (e.g., from a secondary power source such as a generator). In other systems, the second power may be primary power while the first power may be secondary power, or both the first and second power may secondary power. Therefore, the power management systems may provide flexibility in establishing what types of power (i.e., primary, secondary or neither) are provided to a load that is connected to the transfer switch.

The power management system may include multiple transfer switches connected with the generator controller. The generator controller may be able to selectively activate some (or all) of the transfer switches. Therefore, the generator controller may be able to determine what type of power (i.e., primary, secondary or neither) is provided to the respective loads that are connected to each of the transfer switches.

Figure 1:
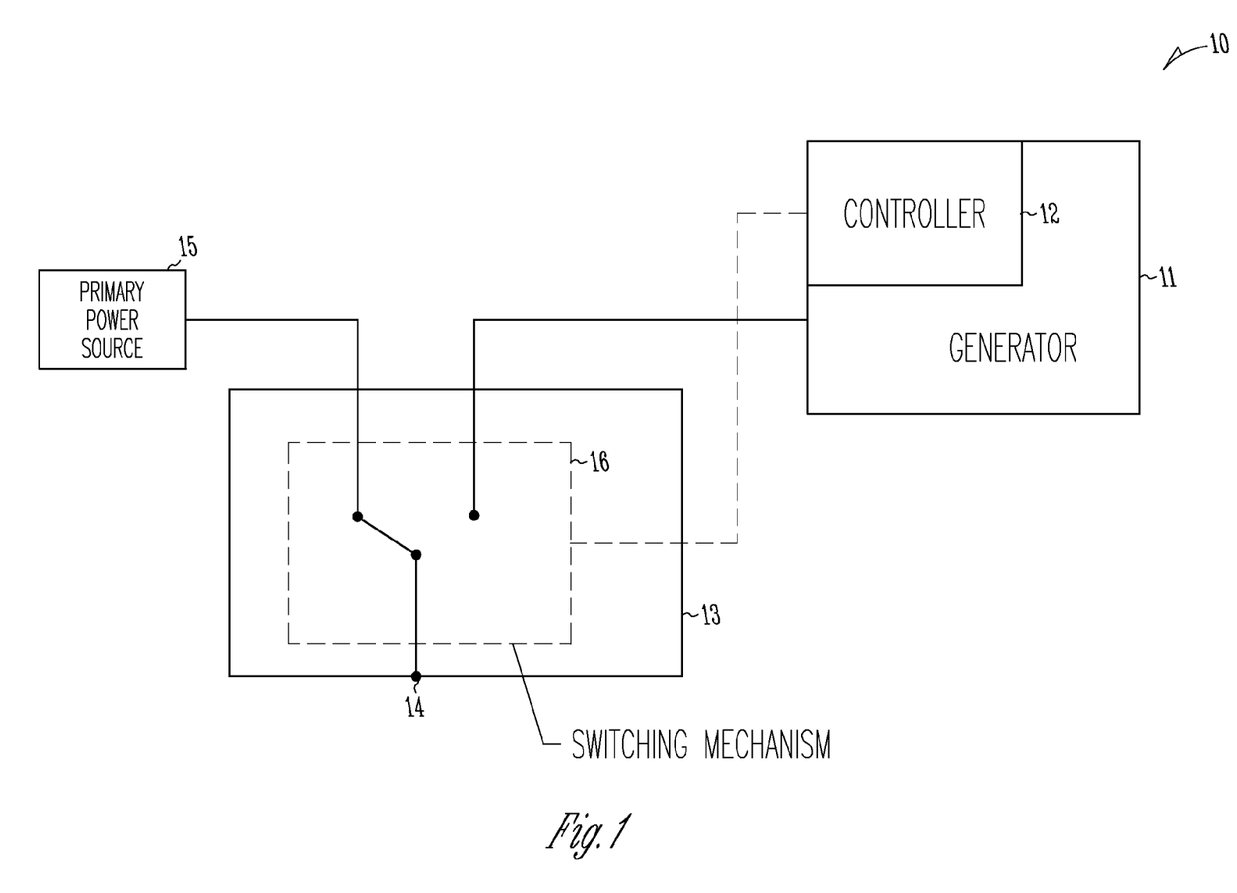
FIG. 1 illustrates an example power management system that includes a generator controller.

FIG. 1 illustrates an example power management system 10. The power management system 10 may include a generator 11 with a generator controller 12, a transfer switch 13 having an output 14 and a switching mechanism 16, and a primary power source 15. In other variations, the power management system 10 may include fewer, more, or different components.

The generator 11 may include an internal combustion engine that drives an alternator to generate electrical energy. The generator 11 may be configured to provide secondary power. The generator controller 12 may operate the generator 11, and may control when the generator 11 provides the secondary power.

The generator 11 may be connected with, and may provide secondary power to, a transfer switch 13. The transfer switch 13 may additionally be connected with a primary power source 15. The primary power source 15 may be configured to provide primary power to the transfer switch 13. The transfer switch 13 may include a switching mechanism 16 that may be moved to and between various positions. For example, the switching mechanism 16 may be positioned in a primary power position, during which primary power from the primary power source 15 may be delivered by the transfer switch 13 to an output 14 of the transfer switch 13. As another example, the switching mechanism 16 may be positioned in a secondary power position, during which secondary power from the generator 11 may be delivered by the transfer switch 13 to an output 14 of the transfer switch 13. As a third example, the switching mechanism 16 may be positioned in an off position or a no power position, during which neither primary power from the primary power source 15 nor secondary power from the generator 11 may be delivered by the transfer switch 13 to an output 14 of the transfer switch 13.

The generator controller 12 may be configured to control the transfer switch 13 and prohibit the transfer switch 13 from supplying primary power (e.g., from a primary power source 15 such as a utility) or secondary power from the generator 11 to an output 14 of the transfer switch 13.

In some systems, the generator controller 12 may be configured to operate a switching mechanism 16 in the transfer switch 13. For example, the generator controller 12 may control the position of the switching mechanism 16 which determines whether the transfer switch 13 provides primary power or secondary power to the output 14. The generator controller 12 may position the switching mechanism 16 to prohibit the transfer switch 13 from supplying primary power, secondary power, or both to an output 14 of the transfer switch. As an example, the generator controller 12 may control the position of the switching mechanism 16 by sending a signal to the switching mechanism 16 that controls the position of the switching mechanism 16. It should be noted that any type of switching mechanism 16 that is known now or discovered in the future may be utilized in the transfer switch 13.

The generator controller 12 may be configured to prevent the switching mechanism 16 from providing secondary power to the output 14. For example, the generator controller 12 may set the position of the switching mechanism 16 to a primary power position or an off position when primary power is not available and secondary power is available. As another example, the generator controller 12 may be configured to prohibit a designated transfer switch 13 from supplying secondary power to an output 14 of the transfer switch 13 by ignoring a start signal that is sent to the generator 11 from the transfer switch 13. Since the generator 11 may not start as a result of the signal from the designated transfer switch 13, the generator 11 may not provide secondary power to transfer switch 13.

Figure 2:
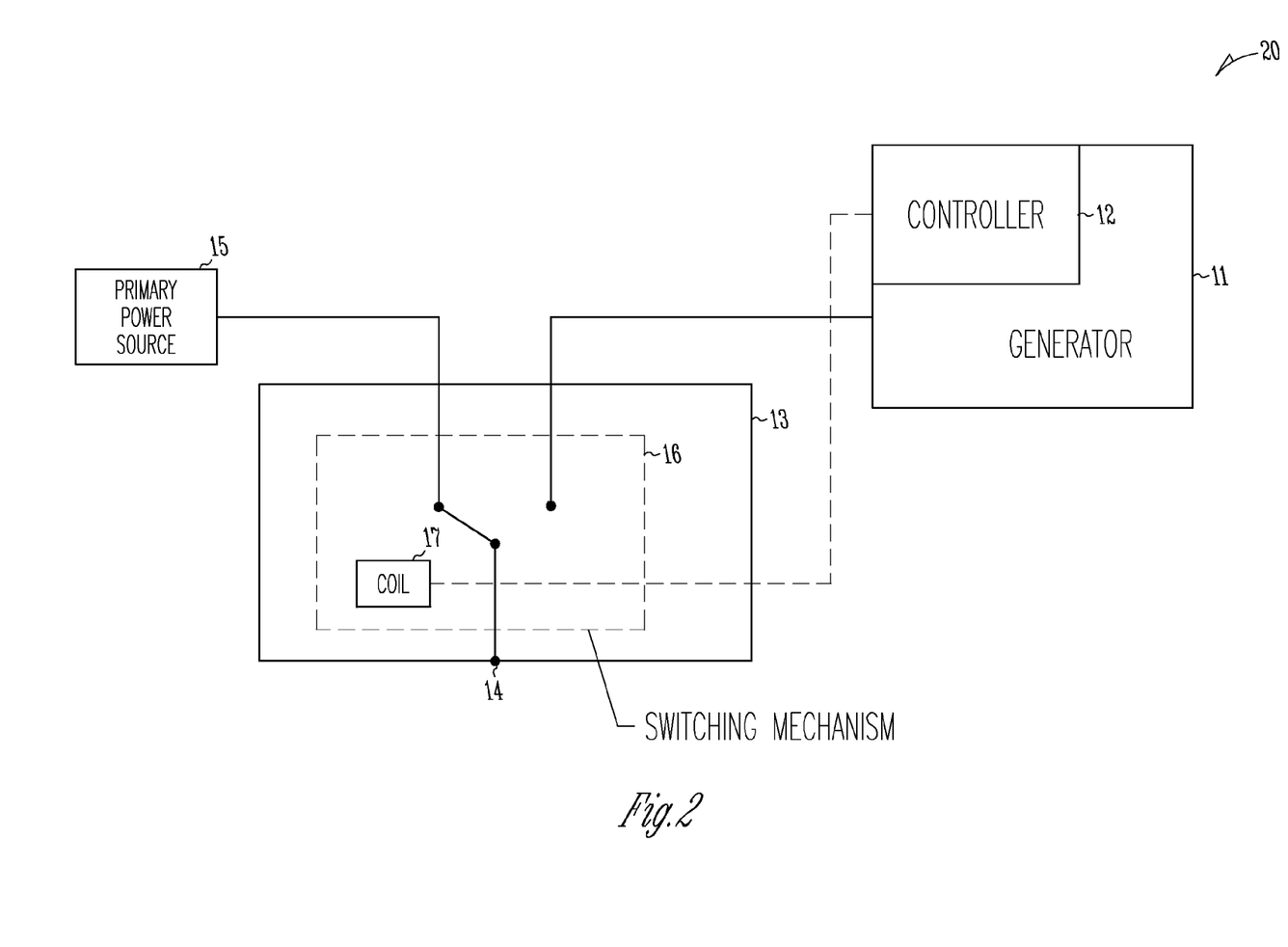
FIG. 2 illustrates an example power management system where the transfer switch includes a coil.

FIG. 2 shows an example power management system 20. In this example power management system 20, the switching mechanism 16 may include a transfer coil 17. The generator controller 12 may be configured to control power to the transfer coil 17. For example, the generator controller 12 may supply (or interrupt) power to the transfer coil 17 to move (or prevent from moving) the switching mechanism 16 between a primary power position, a secondary power position, and a no power position. The generator controller 12 may thus control the transfer coil 17 to prevent the switching mechanism 13 from providing primary power or secondary power to the output 14. Other systems may include a plurality of transfer coils in order to enable the transfer switch to supply primary power, a secondary power or no power. Some systems may include devices besides transfer coils to move (or prevent from moving) the switching mechanism 16.

Figure 3:
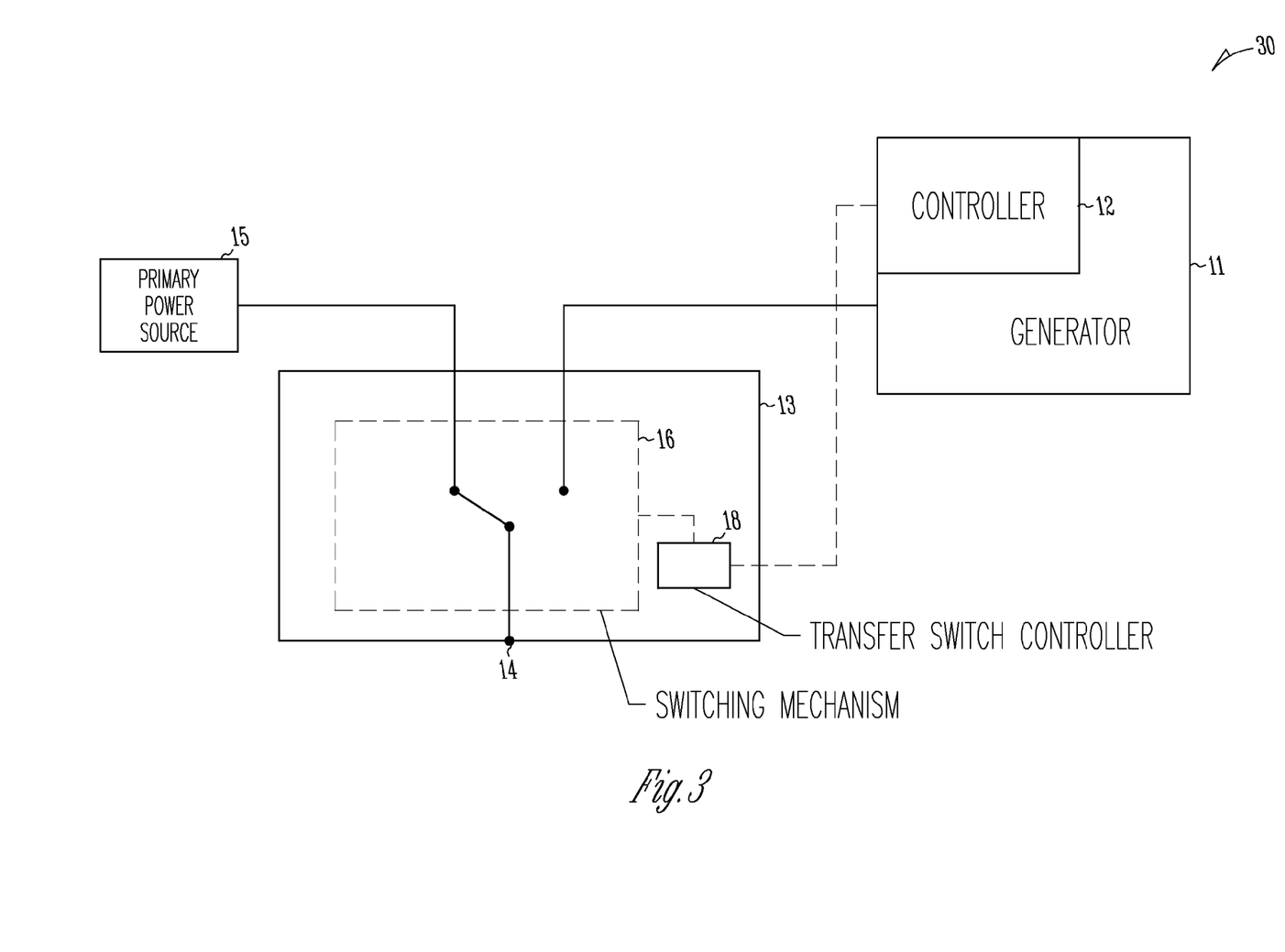
FIG. 3 illustrates an example power management system where the power management system includes a transfer switch controller.

FIG. 3 shows an example power management system 30, where the transfer switch 13 includes a transfer switch controller 18. The transfer switch controller 18 may control an operation of the transfer switch 13, such as a position of the switching mechanism 16. The generator controller 12 may communicate with the transfer switch controller 18, and may control the transfer switch 13 through the transfer switch controller 18. For example, the generator controller 12 may provide a signal to the transfer switch controller 18 to prevent the switching mechanism 13 from providing primary (or secondary) power to the output 14. In some variations, the generator controller 12 may provide a signal to another type of controller to prevent the switching mechanism 16 from providing primary power to the output 14. The determination as to whether the generator controller 12, the transfer switch controller 18 or another controller provides a signal to the switching mechanism 16 may depend in part on the overall design, arrangement and components that are included in the power management system.

Figure 4:
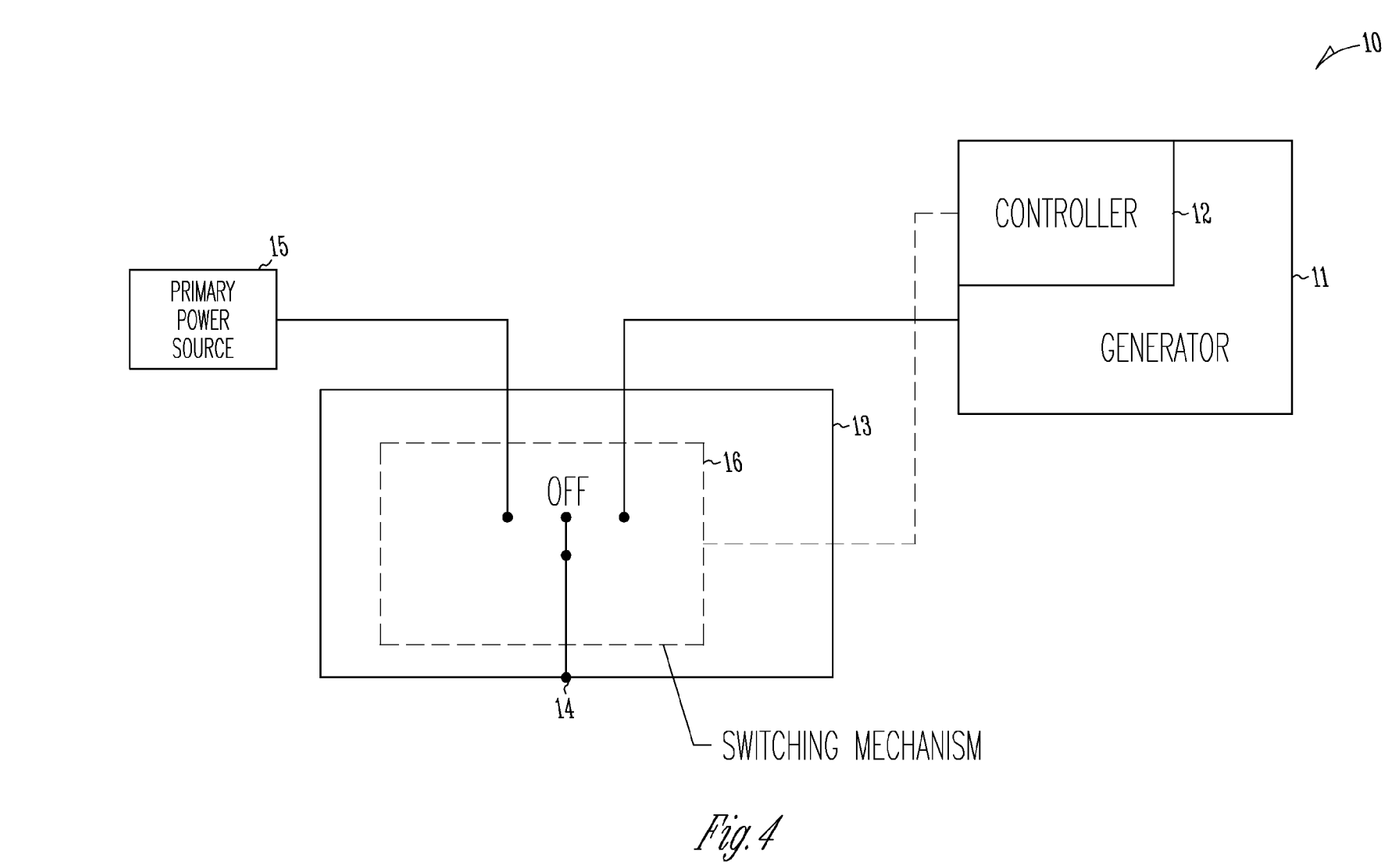
FIG. 4 illustrates an example power management system that includes a generator controller and a switching mechanism that is in an off position.

FIG. 4 illustrates the power management system 10 where the switching mechanism 16 is in an off position. In the off position, neither the primary power source 15 nor the generator 11 is connected to the output 14. The physical design of the "off" position for the transfer switch 13 may depend in part on the type of transfer switch 13 that is utilized in the power management system. As an example, the switching mechanism 16 may be moved to the off position because a facility manager has determined that a user (e.g. a renter) of the primary and secondary power may not have paid fee to be eligible to receive the primary and secondary power. In another example, the facility manager may determine that a particular building (or room in a building) should not receive primary or secondary power.

Figure 5:
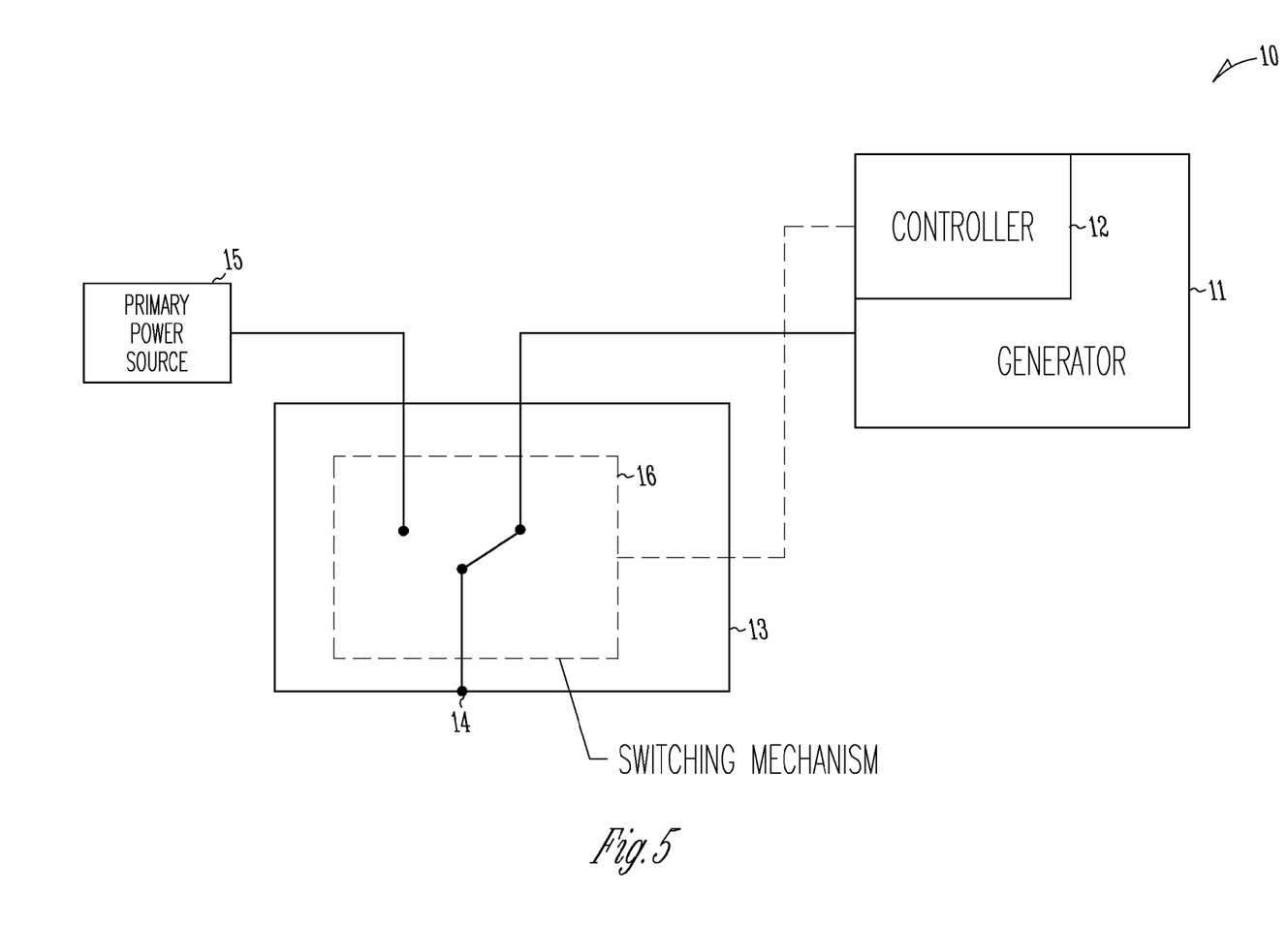
FIG. 5 illustrates an example power management system that includes a generator controller and a transfer switch providing secondary power to an output.

FIG. 5 illustrates the power management system 10 where the switching mechanism 16 is in the secondary power position. When the generator controller 12 determines that a load connected with the output 14 should not have primary power 15, the generator controller 12 may override any other logic within the transfer switch 13 and force the switching mechanism 16 to the secondary power position. The generator controller 12 may thus prevent the switching mechanism 13 from providing primary power 15 to the output 14 by moving the switching mechanism 16 to the secondary power position.

Figure 6:
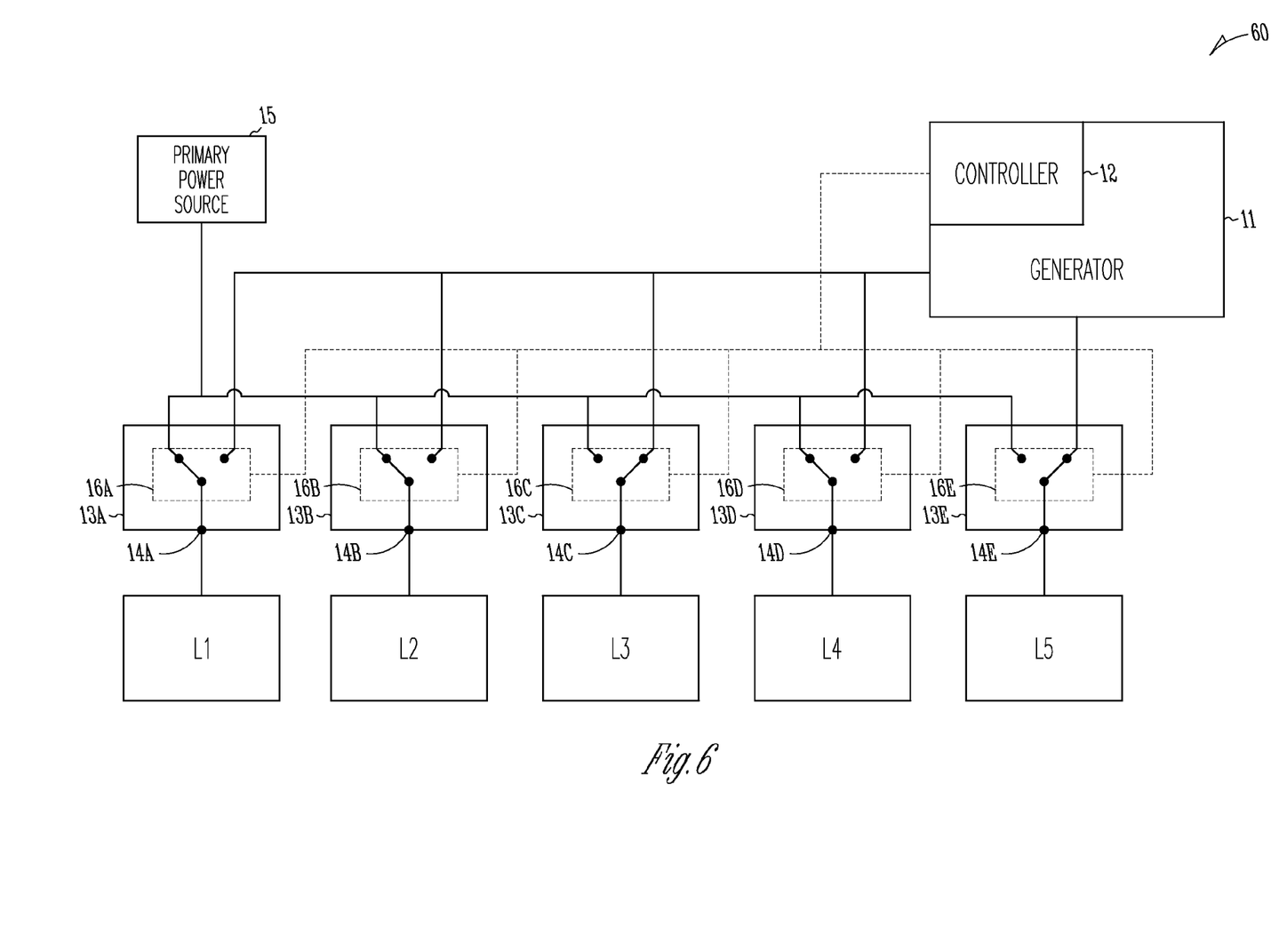
FIG. 6 illustrates an example power management system that includes a generator controller connected with a plurality of transfer switches.

FIG. 6 illustrates an example power management system 60 where the generator controller 12 is connected with a plurality of transfer switches 13A, 13B, 13C, 13D, 13E. The transfer switches 13A, 13B, 13C, 13D, 13E may include switching mechanisms 16A, 16B, 16C, 16D, 16E and outputs 14A, 14B, 14C, 14D, 14E connected with different loads L1, L2, L3, L4, L5. The generator 11 and generator controller 12 may be connected with any number of transfer switches.

The generator controller 12 may control a position of one or more of the switching mechanisms 16A, 16B, 16C, 16D, 16E of the transfer switches 13A-13E. For example, the generator controller 12 may direct transfer switches 13A, 13B, 13D to provide primary power 15 to loads L1, L2, L4 and may direct transfer switches 13C, 13E to provide secondary power from generator 11 to loads L3, L5. The generator controller 12 may control and position any of the switching mechanisms 16A, 16B, 16C, 16D, 16E in any of the primary power position, the secondary power position, or the off position. The generator controller 12 may, for example, prohibit each of the transfer switches 13A, 13B, 13C, 13D, 13E from supplying primary or secondary power to an output 14A, 14B, 14C, 14D, 14E of the respective transfer switches 13A, 13B, 13C, 13D, 13E.

Figure 7:
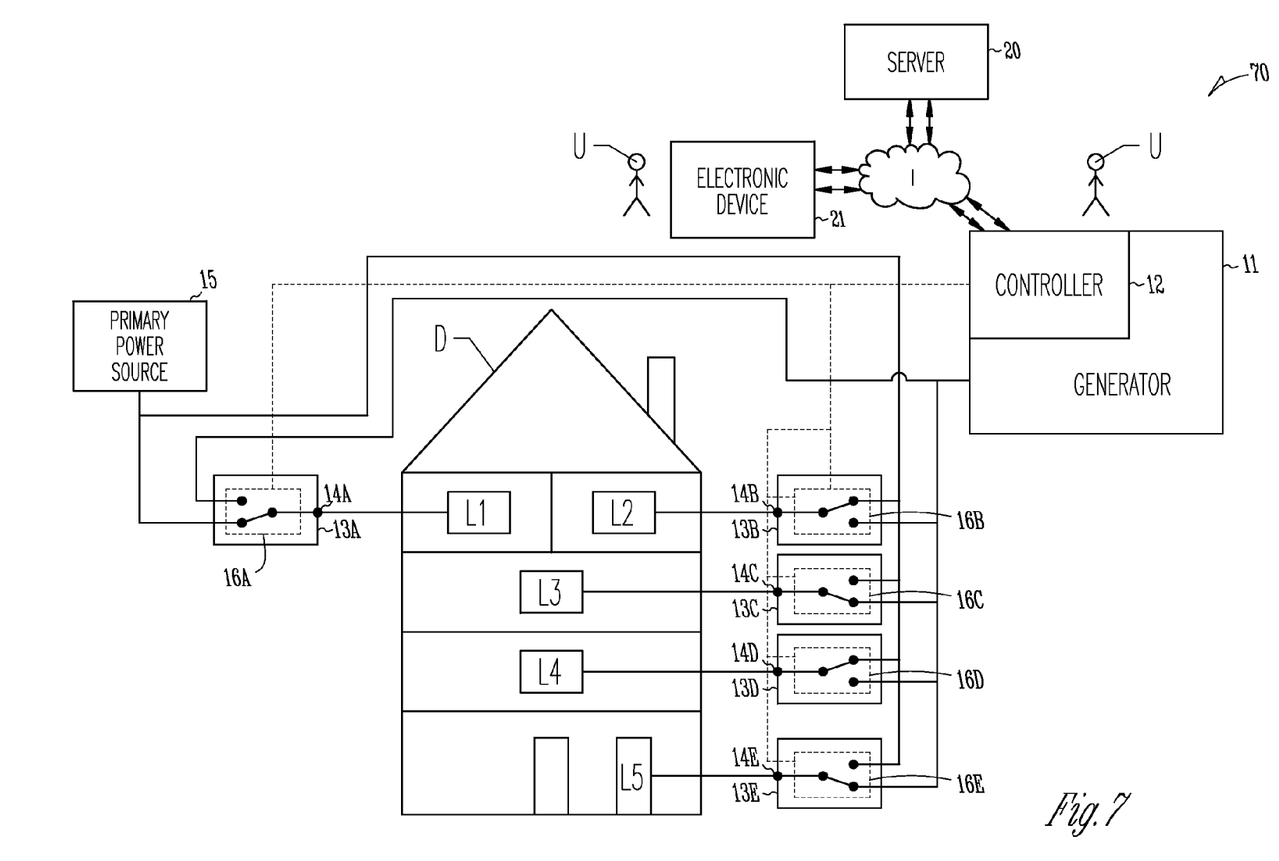
FIG. 7 illustrates an example power management system with a plurality of transfer switches connected with loads that are located within different rooms in a dwelling.
Figure 8:
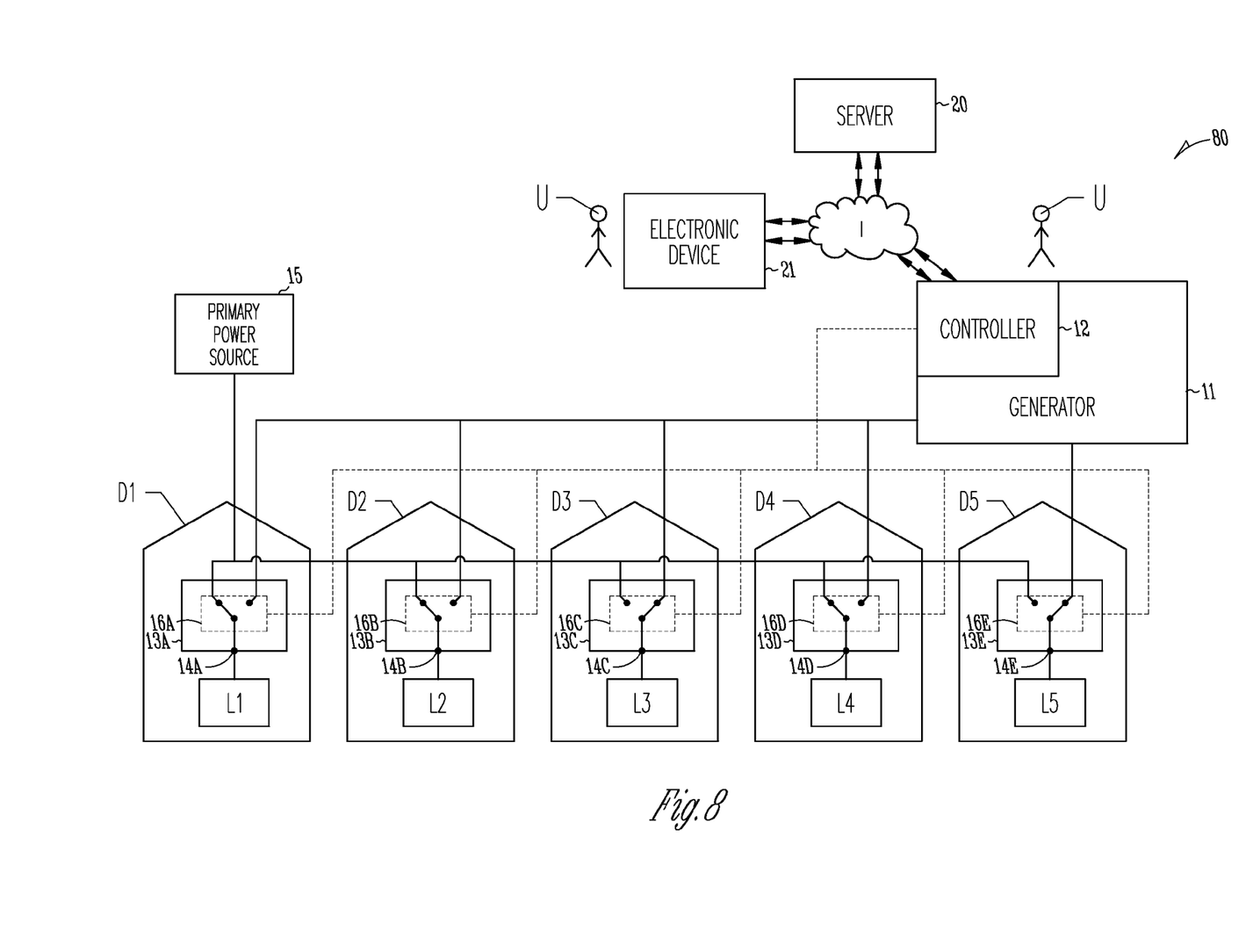
FIG. 8 illustrates an example power management system with a plurality of transfer switches connected with loads that are located within different dwellings.

FIG. 7 illustrates an example power management system 70 where the transfer switches 13A, 13B, 13C, 13D, 13E provide power to respective loads L1, L2, L3, L4, L5 that are located within different rooms in a dwelling D. FIG. 8 illustrates an example power management system 80 where the transfer switches 13A, 13B, 13C, 13D, 13E provide power to respective loads L1, L2, L3, L4, L5 that are located within different dwellings D1, D2, D3, D4, D5. In other systems, the loads L1, L2, L3, L4, and L5 may be positioned in other rooms, buildings, dwellings, locations inside or outside, or any combination. In the examples in FIGS. 7 and 8, the generator controller 12 has directed transfer switches 13A, 13B, 13D to provide primary power to loads L1, L2, L4 and directed transfer switches 13C, 13E to provide secondary power to loads L3, L5. In other examples, the generator controller 12 may alternatively direct any of the transfer switches 13A-E to provide any of the primary power, secondary power, or no power to the loads L1-L5, such as by controlling the position of the switching mechanisms 16A, 16B, 16C, 16D, 16E of the transfer switches 13A-13E.

The generator controller 12 may be controlled remotely, such as through a network I, by an electronic device 21 operated by a user U. The electronic device 21 may send signals to the generator controller 12 to selectively control operation of at least some of the transfer switches 13A, 13B, 13C, 13D, 13E. The generator controller 12 may permit the user U to prohibit selected transfer switches 13A, 13B, 13C, 13D, 13E from supplying primary or secondary power to the respective outputs 14 of the selected transfer switches 13A, 13B, 13C, 13D, 13E.

As an example, the generator controller 12 may receive a signal from an electronic device 21 through the network I to prohibit the selected transfer switches 13A, 13B, 13C, 13D, 13E from supplying primary or secondary power to the respective outputs 14A, 14B, 14C, 14D, 14E of the selected transfer switches 13A, 13B, 13C, 13D, 13E based on a location of the respective loads L1, L2, L3, L4, L5 that are connected to the respective outputs 14 of the transfer switches 13A, 13B, 13C, 13D, 13E.

Additionally or alternatively, the generator controller 12 may automatically selectively control operation of at least some of the transfer switches 13A, 13B, 13C, 13D, 13E based on one or more parameters. The parameters by which the generator controller 12 selectively controls operation of the transfer switches 13A, 13B, 13C, 13D, 13E may depend in part on the application where the example power management systems are being utilized.

In addition, the generator controller 12 may permit the user U to set the parameters. FIGS. 7 and 8 show where the user U may interact with the generator controller 12 via a display on the generator controller 12 or remotely via a network (e.g., the Internet I) which is connected to the generator controller 12 via server 20. The user U accesses the server 20 with an electronic device 21 (e.g., computer, laptop, tablet, phone, etc.). It should be noted that portions of the network may be wired or wireless.

As an example, a landlord may elect to cut off primary and/or secondary power to a renter based on timely payment of rent that is due to the landlord. Another example may be that a landlord charges an extra fee for the availability of secondary power to a renter from a generator 11 when there is an interruption in primary power.

As discussed above, the generator controller 12 may automatically determine the position of any of the transfer switches 13A, 13B, 13C, 13D, 13E based on a parameter. Parameters that the generator may monitor and use to determine a position of the transfer switches 13A, 13B, 13C, 13D, 13E may include a date, season or time of year. For example, the generator controller 12 may automatically prohibit primary or secondary power to a respective output 14A, 14B, 14C, 14D, 14E during winter season. Other example automatic parameters that the generator controller 12 may monitor and use to determine a position of the transfer switches 13A, 13B, 13C, 13D, 13E, and/or automatically prohibit primary and/or secondary power to the respective outputs 14A, 14B, 14C, 14D, 14E may include temperature, ambient noise level, a received utility request, time of day, or weather conditions.

Figure 9:
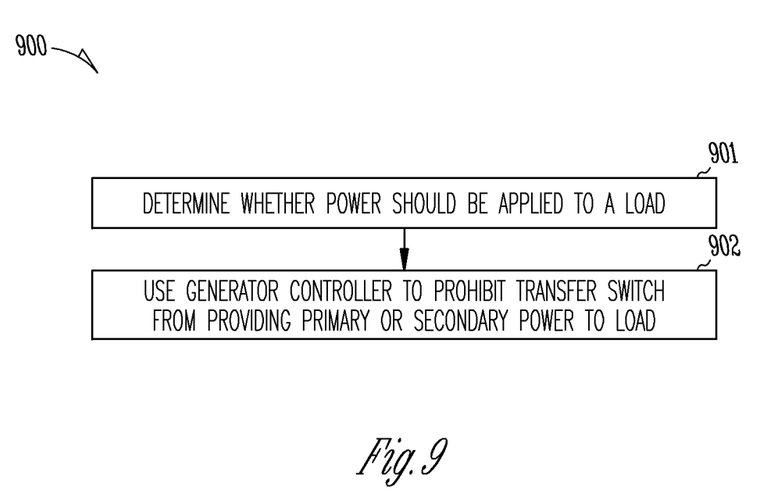
FIG. 9 is a flow diagram illustrating an example method of controlling a transfer switch.

FIG. 9 illustrates an example embodiment of a method 900 of controlling a transfer switch. Part or all of the method 900 may be performed by the generator controller 12 or various other components. Part or all of the method 900 may be implemented as logic, which the generator controller 12 may execute.

The method 900 may include [901] determining whether power should (or should not) be applied to a load where the load is connected to a transfer switch 13. The method 900 may further include [902] using a generator controller 12 to prohibit the transfer switch 12 from providing primary or secondary power to the load. As an example, determining whether power should be applied to a load may include determining whether a user of the load has paid a fee to receive primary or secondary power (see, e.g., facility manager example described above).

In some embodiments, [902] using a generator controller 12 to prohibit the transfer switch 13 from providing primary or secondary power to the load includes using the generator controller 12 to move a switching mechanism 16 within the transfer switch 13 to (i) prevent providing secondary power to the load; (ii) an off position to prevent providing primary power and secondary power to the load; and/or (iii) prevent providing primary power to the load. It should be noted that the determination as whether to prevent primary and/or secondary power to the load, or move the transfer switch to an off position, may depend in part on the application where the power management system 10 is being utilized.

In addition, [901] determining whether power should be applied to a load may include determining whether power should be applied to a plurality of loads L1, L2, L3, L4, L5 where at least some of the loads are connected to respective transfer switches 13A, 13B, 13C, 13D, 13E. The method 900 may further include using the generator controller 12 to prohibit particular transfer switches 13A, 13B, 13C, 13D, 13E from providing primary power or secondary power to the loads L1, L2, L3, L4, L5 that are connected to the respective transfer switches 13A, 13B, 13C, 13D, 13E.

Figure 10:
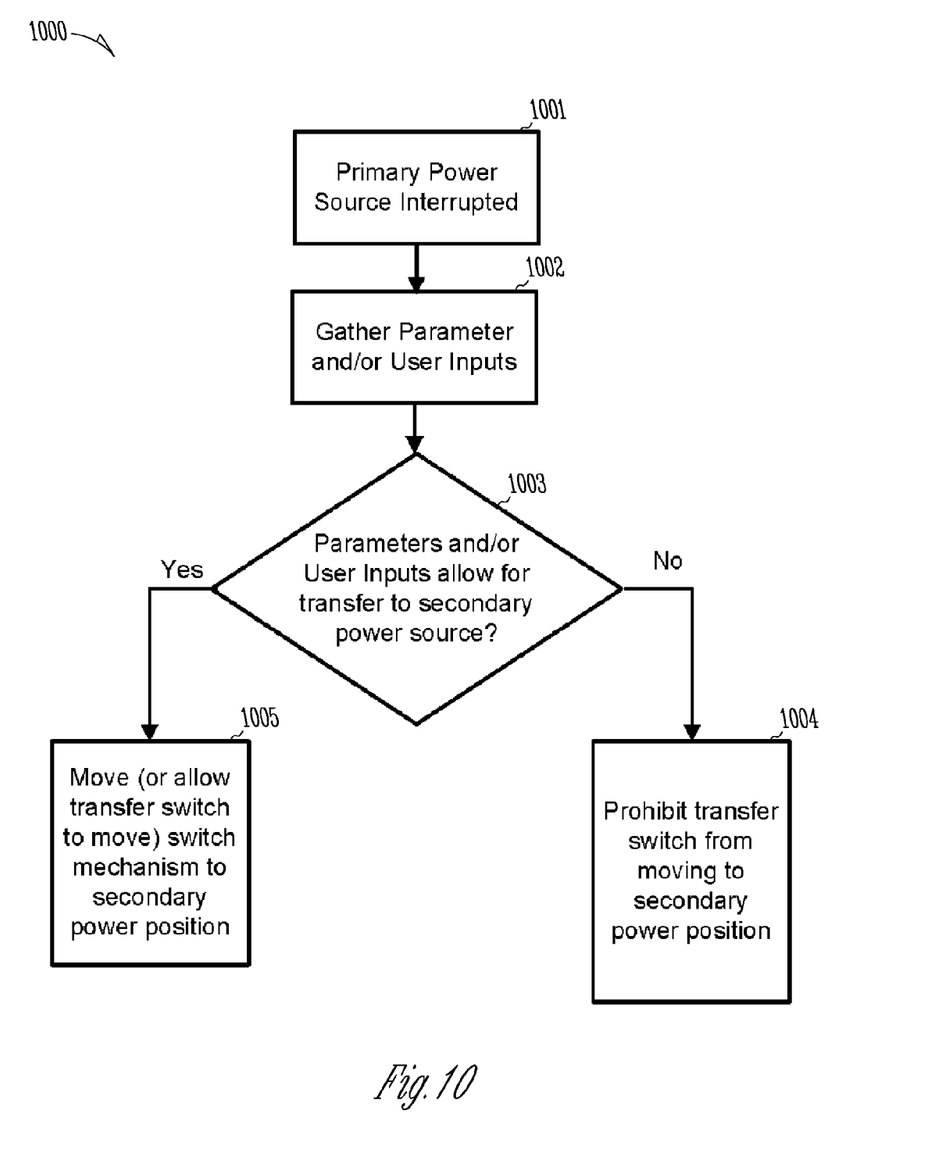
FIG. 10 is a flow diagram illustrating another example method of controlling a transfer switch.

FIG. 10 is a flow diagram illustrating another example method 1000 of controlling a transfer switch 13. The method 1000 may be performed by the generator controller 12 or various other components. The method 1000 may be implemented as logic, which the generator controller 12 may execute.

The method may include [1001] detecting an interruption in primary power from a primary power source 15, and [1002] gathering parameter information about a load, the load connected with the primary power source 15 and a generator 11 (see, e.g., automatic parameter information discussed above). Parameter information may be gathered by or using sensors, inputs, information stored in a server, events, or in various other ways. The parameter information may include information about the load, a power-consuming device connected with the load, or a user of the load.

The method [1000] may include [1003] determining whether the load can receive generator power from the generator 11 based on the parameter information. For example, the controller 12 may compare the parameter information to one or more thresholds or input the parameter information into one or more decision algorithms or trees, from which the controller 12 may determine whether or not the load can receive power from the generator 11. As a specific example, the controller 12 may gather parameter information may include information that the user of the load is not allowed to receive secondary power, and may thus conclude that no generator power may be supplied to the load based on the received parameter information. Other examples are possible.

The method [1000] may include [1004] prohibiting the load from receiving the generator power when the interruption is detected and the determination indicates that the load cannot receive the generator power. Additionally or alternatively, the method [1000] may include or [1005] allowing the load to receive generator power when the interruption is detected and the determination indicates that the load can receive the generator power.

In some examples of the method [1000], [1004] prohibiting the load from receiving the generator power may include ignoring signals from a transfer switch 13 that indicates when primary power has been interrupted where the transfer switch 13 is connected to the load.

In another example of the method [1000], the parameter information may include information about whether the load was eligible to receive the primary power immediately prior to the interruption such that the load cannot receive generator power from the generator when the parameter information indicates that the load was not eligible to receive the primary power immediately prior to the interruption. In some variations, the method [1000] may include fewer, more, or different blocks. Additionally or alternatively, one or more blocks of the method may be performed in a different order or simultaneously. Other variations are possible.

Figure 11:
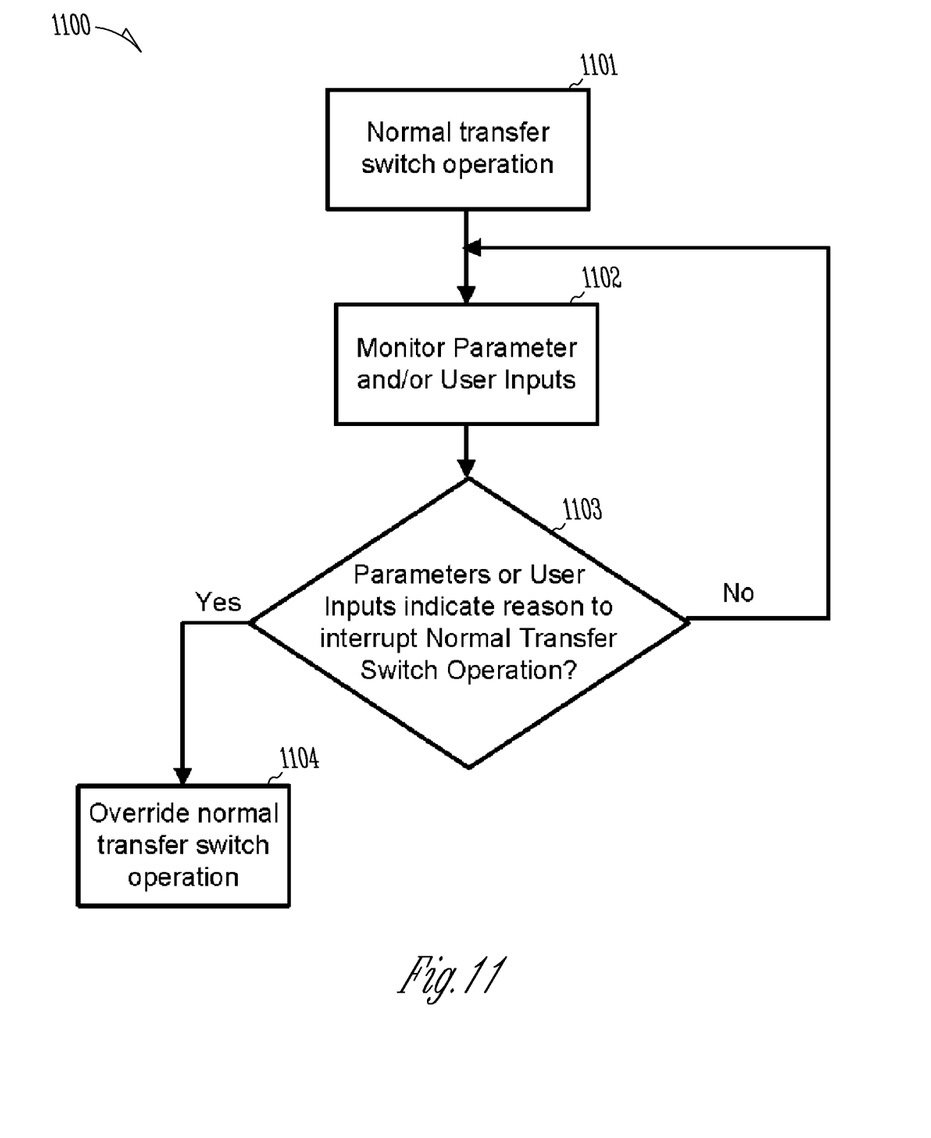
FIG. 11 is a flow diagram illustrating still another example method of controlling a transfer switch.

FIG. 11 is a flow diagram illustrating another example method 1100 of controlling a transfer switch 13. The method 1100 may be performed by the controller 12 or various other components. The method 1100 may be implemented as logic, which the controller 12 may execute.

The method may include [1101] operating a transfer switch 13 in a normal manner, and [1102] gathering parameter information and/or user inputs about a load, the load connected with the primary power source 15 and a generator 11. The method [1100] may further include [1103] determining whether to interrupt normal transfer switch 13 operation based on the parameter information or user inputs.

The method may include [1004] overriding normal transfer switch 13 operation when the parameter information or user inputs indicate that the normal transfer switch 13 operation should be interrupted. For example, where the normal transfer switch 13 operation would require the switching mechanism 16 to switch from a primary power position to a secondary power position, and where the parameter information indicates that the user of the load should not receive secondary power, the controller 12 may override the transfer switch 13 operation and control the switching mechanism 16 to stay in the primary power position or move the switching mechanism 16 to an off position. Other variations are possible. If, instead, the normal transfer switch 13 operation should not be interrupted, the method may return to block 1102, and the parameter information and/or user inputs may continue to be gathered. In some variations, the method [1100] may include fewer, more, or different blocks. Additionally or alternatively, one or more blocks of the method [1100] may be performed in a different order or simultaneously. Other variations are possible.

The example power management systems and methods described herein include a generator controller 12 that is configured to prohibit a transfer switch 13 from supplying primary and/or secondary power to an output 14 of the transfer switch 13. Therefore, the power management systems and methods may provide flexibility in establishing what types of power (i.e., primary, secondary or neither) are provided to a load that is connected to the transfer switch 13.

In addition, the example power management systems and methods described herein may include a generator controller 12 that is configured to prohibit multiple transfer switches 13A, 13B, 13C, 13D, 13E from supplying primary and/or secondary power to respective outputs 14 of the transfer switches 13A, 13B, 13C, 13D, 13E. Therefore, the generator controller 12 is able to establish what type of power (i.e., primary, secondary or neither) is provided to the respective loads L1, L2, L3, L4, L5 that are connected to the outputs 14 of each of the transfer switches 13A, 13B, 13C, 13D, 13E.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A power management system comprising:
   a generator that includes an internal combustion engine and an alternator; and
   a generator controller that operates the generator, wherein the generator controller is configured to prohibit at least some of a plurality of transfer switches from supplying secondary power or primary power to outputs of the respective transfer switches;
   wherein each of the respective outputs on the transfer switches provides power to a load, wherein each load is located in a different location, wherein each of the locations corresponds to a different residence in a dwelling or residential community.

2. The power management system of claim 1, wherein the primary power is provided by a utility.

3. The power management system of claim 1, wherein the generator controller prohibits certain transfer switches from supplying the secondary power when the primary power is unavailable by controlling a position of a switching mechanism of the respective transfer switch.

4. The power management system of claim 3, wherein the generator controller controls the position of the switching mechanism by controlling power to a transfer coil of the switching mechanism.

5. The power management system of claim 3, wherein the generator controller controls the position of the switching mechanism by providing a signal to a transfer switch controller that controls the respective transfer switch.

6. The power management system of claim 3, wherein the generator controller prohibits certain transfer switches from supplying the secondary power when the primary power is unavailable by controlling the position of the switching mechanism to correspond to a position wherein the primary power is connected with the output.

7. The power management system of claim 3, wherein the generator controller prohibits certain transfer switches from supplying the secondary power when the primary power is unavailable by controlling the position of the switching mechanism to correspond to an off position, wherein neither the secondary power nor the primary power is connected to the output.

8. The power management system of claim 1, wherein the generator controller is configured to receive a user input prohibiting selected transfer switches from supplying secondary power or primary power to the respective outputs of the selected transfer switches.

9. A power management system comprising:
a generator that includes an internal combustion engine and an alternator; and
a generator controller that operates the generator, wherein the generator controller is configured to prohibit at least some of a plurality of transfer switches from supplying secondary power or primary power to outputs of the respective transfer switches, wherein each of the respective outputs on the transfer switches provides power to a load, wherein the generator controller is configured to prohibit at least some of the plurality of transfer switches from supplying the secondary power or primary power to outputs of the respective transfer switches based on whether a user of the load has paid a fee to receive the primary power or the secondary power.

10. The power management system of claim 9, wherein the primary power is provided by a utility.

11. The power management system of claim 9, wherein the generator controller prohibits certain transfer switches from supplying the secondary power when the primary power is unavailable by controlling a position of a switching mechanism of the respective transfer switch.

12. The power management system of claim 11, wherein the generator controller controls the position of the switching mechanism by providing a signal to a transfer switch controller that controls the respective transfer switch.

13. The power management system of claim 11, wherein the generator controller prohibits certain transfer switches from supplying the secondary power when the primary power is unavailable by controlling the position of the switching mechanism to correspond to a position where the primary power is connected with the output.

14. The power management system of claim 9, wherein the generator controller is configured to receive a user input prohibiting selected transfer switches from supplying secondary power and primary to the respective outputs of the selected transfer switches.

15. A power management system comprising:
a generator that includes an internal combustion engine and an alternator; and
a generator controller that operates the generator, wherein the generator controller is configured to prohibit at least one of a plurality of transfer switches from supplying the secondary power or primary power to outputs of the respective at least one transfer switches based on an environmental condition, wherein each of the respective outputs on the at least one transfer switches provides power to a load, wherein the environmental condition includes at least one of temperature, ambient noise level, a received utility request, time of day or weather conditions.

16. The power management system of claim 15, wherein the primary power is provided by a utility.

17. The power management system of claim 15, wherein the generator controller prohibits certain transfer switches from supplying secondary power when the primary power is unavailable by controlling a position of a switching mechanism of the respective transfer switch.

18. The power management system of claim 15, wherein the generator controller prohibits certain transfer switches from supplying secondary power when the primary power is unavailable by controlling the position of the switching mechanism to correspond to a position where the primary power is connected with the output.

19. The power management system of claim 15, wherein the generator controller is configured to prohibit at least some of the plurality of transfer switches from supplying secondary power to outputs of the respective transfer switches based on ambient temperature where the generator is located.

20. The power management system of claim 15, wherein the generator controller is configured to prohibit at least some of the plurality of transfer switches from supplying secondary power to outputs of the respective transfer switches based on ambient noise where the generator is located.

* * * * *